United States Patent
Hira et al.

(10) Patent No.: US 6,633,351 B2
(45) Date of Patent: Oct. 14, 2003

(54) OPTICAL FUNCTIONALITY SHEET, AND PLANAR LIGHT SOURCE AND IMAGE DISPLAY APPARATUS USING THE SAME SHEET

(75) Inventors: Yasuo Hira, Yokohama (JP); Toshihiko Ariyoshi, Onomichi (JP)

(73) Assignees: Hitachi, Ltd., Tokyo (JP); Nitto Denko Corporation, Ibaraki (JP)

(*) Notice: Subject to any disclaimer, the term of this patent is extended or adjusted under 35 U.S.C. 154(b) by 122 days.

(21) Appl. No.: 09/764,290

(22) Filed: Jan. 19, 2001

(65) Prior Publication Data

US 2001/0012078 A1 Aug. 9, 2001

(30) Foreign Application Priority Data

Jan. 21, 2000 (JP) ........................................ 2000-017759

(51) Int. Cl.[7] ........................ G02F 1/1335; G02B 27/10
(52) U.S. Cl. ........................ 349/95; 349/112; 349/62; 359/619
(58) Field of Search ........................ 349/61, 62, 113; 359/619, 628, 627; 362/32, 31, 302

(56) References Cited

U.S. PATENT DOCUMENTS 5,598,281 A * 1/1997 Zimmerman et al. .......... 349/5
6,266,113 B1 * 7/2001 Yamazaki et al. .......... 349/115

FOREIGN PATENT DOCUMENTS

JP 10-241434 9/1998

* cited by examiner

Primary Examiner—Tarifur Chowdhury
Assistant Examiner—Hoan Nguyen
(74) Attorney, Agent, or Firm—Antonelli, Terry, Stout & Kraus, LLP

(57) ABSTRACT

An optical functionality sheet provided with microlenses and a functional film (reflective film or light-blocking film/light-diffusing layer), with the above described functional film formed upon a patterned transparent conductive film. Thereby, self-alignment exposure using microlenses is made possible, and an optical functionality sheet with good directivity with respect to incident light, and good angle of visibility characteristics, can be realized.

11 Claims, 11 Drawing Sheets

(SELF-ALIGNMENT BY MEANS OF MICROLENSES)

(SELF-ALIGNMENT BY MEANS OF MICROLENSES)

(SELF-ALIGNMENT BY MEANS OF MICROLENSES)

OPTICAL FUNCTIONALITY SHEET, AND PLANAR LIGHT SOURCE AND IMAGE DISPLAY APPARATUS USING THE SAME SHEET

BACKGROUND OF THE INVENTION

The present invention relates to an optical sheet that has a function of improving a directivity of light rays—that is, an optical functionality sheet composed of a microlens array and a reflective film or light-blocking film—and a planar light source, and liquid crystal display apparatus using this sheet.

Recently, image display apparatuses, of which liquid crystal display panels are representative examples, have come into wide general use as display means for personal computers, workstations, and so forth. In terms of the quality of the images displayed using such display apparatuses, the characteristics demanded are high brightness and high display contrast, together with a wide angle of visibility.

In order to realize the above described image quality, an installation of a light-diffusing plate between a liquid crystal display panel and a back light source has been disclosed in JP-A-6-95099 specification. Also, a method has been disclosed for enlarging an angle of visibility by installing a sheet that has a microlens array and a light-blocking layer on a liquid crystal image display surface.

Moreover, in JP-A-10-39769 specification, a screen that coordinates array patterns of microlenses and light-blocking film has been disclosed as the screen of a rear-projection type projection apparatus.

When the above described wide-angle-of-visibility sheet is used in a liquid crystal display apparatus, characteristics required of the light source are high directivity and nearly collimated light rays (parallel light rays). The reason for this is that, if the light rays were not parallel, the rays would not be converged sufficiently by the microlenses, and would be projected onto areas where the light should be blocked. This would cause light loss and reduce the brightness of the image display apparatus.

General planar light sources (backlights) for the above described use employ various kinds of diffusion plates that diffuse light beams randomly, in order to achieve uniformity of brightness of the light emitting surface, and the beams emitted from this light emitting surface do not have directivity.

Furthermore, a so-called louver sheet, comprising many rows of light-blocking walls aligned with the direction of travel of the beams, is known as a light source that has directivity. By means of a louver sheet, it is possible to obtain a planar light source that has arbitrary directivity, by taking emitted light with a spread of 120 degrees or more in an emitting surface, for example, and cutting off beams traveling in other than the required direction by means of light-blocking walls. However, this sheet has low light usage efficiency, and is not suitable for the image display apparatus which is an objective of the present invention.

As another method, a method has been disclosed whereby a prism sheet arrayed with a large number of minute triangular prisms is placed on the surface of a photoconductive plate. This is achieved by controlling to some extent the direction of emission of the beams. This prism sheet enables directivity of the order of ±30 degrees to be obtained, but does not meet the requirements of the image display apparatus which is an objective of the present invention.

A light ray directivity sheet that eliminates the above described problems, has high light directivity and light usage efficiency, is moreover of thin shape, and enables a uniform planar light source to be obtained, and a directional planar light source using this, have been disclosed in JP-A-9-1675133 specification and JP-A-10-241434 specification.

This method consists of a light ray directivity sheet, one surface of which comprises a group of microlenses in which unit lenses are arrayed, and on the other surface of which a light ray blocking film (reflective film) is formed, wherein, at least, areas in the vicinity of the focal points of light rays entering from the microlens group side of the above described light ray blocking film are made apertures. By positioning the surface of this light ray directivity sheet on which the light ray blocking film is formed on the light source side, and positioning the microlens surface on the viewing side (liquid crystal display element side), a planar light source is obtained that is given directivity by the operation of the microlenses.

SUMMARY OF THE INVENTION

By using a planar light source fitted with the above described light ray directivity sheet using microlenses, and an angle of visibility enlargement sheet using similar microlenses, it is possible to realize an image display apparatus with high brightness and a wide field of view.

However, with any sheet, there are many problems that need to be solved in the actual construction process.

First of all, there are major limitations in the construction of an angle of visibility enlargement sheet. That is to say, when a microlens array and a light-blocking layer (black matrix) for suppressing the re-reflection of external light reflected by the surface of this microlens array are combined, it is essential for the layout patterns of the microlenses and light-blocking layer to be precisely positioned relative to each other, since a slight misalignment will halve their function.

Known common methods for forming a light-blocking layer include forming as a thin metal film, and a method whereby a photosensitive resin film, in which a pigment such as carbon black has been dispersed or in which a black or other dye has been dissolved, is formed on a substrate, and is patterned by means of photolithography However, if the light-blocking layer and the microlenses are formed by totally independent processes, and the two are combined later, it can be said that it is difficult to align the two accurately within several $\mu$m. When the size of the microlenses is very small (several tens of $\mu$m), in particular, accurate alignment is extremely difficult.

On the other hand, as a solution to the problems relating to an angle of visibility enlargement sheet, sensitization of a photosensitive layer by energy ray irradiation via optical elements (for example, a microlens array) corresponding to a black matrix pattern, and forming a black matrix of the desired pattern, has been disclosed in JP-A-10-246804 specification.

As the microlenses and the transparent parts of the light-blocking layer are formed by means of self-alignment, an advantage of this method is that it is easy to coordinate the respective pattern positions precisely, but the following problem arises in realizing this.

Namely, with the above described method, from the viewpoint of the work processes, a positive-type resist is generally used whereby the parts irradiated with energy rays are sensitized and become soluble in a solvent. However, in order for the light-blocking layer to be formed simultaneously by this method, the use of a non-transparent material containing carbon black, or a black dye or pigment, etc., in the above described resist is assumed. Therefore, the transmittivity of the energy rays, and especially the light rays used for pattern forming, is decreased, and it is difficult to obtain a prescribed pattern.

Therefore, the problem arises of it being necessary to spend a long time on energy ray irradiation, or to make the resist film thin, in order to compensate for the fact that the photo-transmittivity is low. Thus, the exposure process is time-consuming, and it is difficult to obtain a light-blocking film with a high optical density (high light-blocking capability).

Another method is one in which, after a layer constituting the light-blocking layer has been formed using a negative-type resist, the light-blocking layer is patterned by means of photolithography. However, the problem with this method is that the work processes are even more complex, making it impractical.

On the other hand, the same kind of problems as described above also arise with regard to a light ray directivity sheet using microlenses. That is to say, the array patterns of the microlenses and the light-blocking layer must be accurately aligned in order for the function to be fully implemented. This is because any misalignment reduces the parallelism (collimation) of the emitted beams, with a resulting problem of lower emission efficiency of the planar light source.

A reflective film, such as a metal film or titanium oxide, has been proposed as the light-blocking film of the above described light ray directivity sheet, and a self-alignment method, using lenses, has been proposed as the manufacturing method, as in the case of an angle of visibility enlargement sheet.

That is, a negative-type photo-resist is applied to the opposite surface from that with the group of microlenses, and the resist is exposed and developed by irradiation with parallel ultraviolet light from the lens formation surface side. By this means, a band-shaped pattern is formed on the parts corresponding to the lens focal points.

Next, a film that constitutes the light-blocking film is formed upon this. To be specific, a coating material in which titanium oxide is dispersed in acrylic resin is applied, or a film of metal, such as aluminum, is applied by vapor deposition, or a coating material in which carbon black is dispersed in acrylic resin is applied. Then, part of the area of the resist on which the band-shaped pattern has been formed (the projecting area) is cut away. The band-shaped pattern is completely removed with resist remover.

The above described method is called the lift-off method. This method makes it possible to obtain a light ray directivity sheet on which areas in the vicinity of the microlens focal point are made apertures, but it involves many processes, and also presents the following problems.

Namely, it is necessary to make the resist film thick—a problem characteristic of lift-off—and it is difficult to obtain a high-precision pattern with a photolithographic process. Also, an excessive load is applied to the resist in the process for forming the light-blocking film, and complete lift-off of the resist is difficult, among other things.

In order to solve the above described problems, and to obtain functionality sheets with excellent optical characteristics—that is, a light ray directivity sheet and wide-angle-of-visibility sheet—the present invention employs a method whereby a patterned transparent conductive film is used, and a light-blocking film or reflective film is formed thereupon.

That is to say, in the present invention, a transparent conductive film is formed on the other side of a transparent member on which microlenses are formed. Next, a positive-type photo-resist film is formed on this transparent conductive film, and then so-called self-alignment exposure is carried out, whereby exposure is performed from the side on which the microlenses are formed, and aperture areas (transparent portions) are formed on the transparent conductive film by removing the resist, by development, from the lens convergence areas. After this, the transparent conductive film at the aperture areas is removed using an etching method. Lastly, with the transparent conductive film as an electrode, a light-blocking film is formed on this transparent conductive film using a method such as electrodeposition coating, metal plating, electrolysis, or electroforming.

Patterning can be performed easily and with high precision using means whereby patterning is performed by means of light irradiation of the photo-resist film from the side on which the microlenses are formed—that is, self-alignment exposure means—via the above described transparent conductive film. Also, as electrical means such as electrodeposition is used for formation of the light-blocking film, with transparent film as an electrode, it is possible to form a colored film with low transparency, such as a black light-blocking film, a white diffuse reflection film, or a metal film, on a prescribed area with high precision, and to a degree of thickness as necessary.

Therefore, according to the present invention, it is possible to manufacture, with high productivity, an optical functionality sheet provided with microlenses and a diffusive white reflecting film or a light-blocking film, and also a directional planar light source and liquid crystal display apparatus using these.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF PREFERRED EMBODIMENTS

Embodiments of the optical functionality sheet that constitutes the present invention, and cases applying to a planar light source and liquid crystal display apparatus (abbreviated to LCD (Liquid Crystal Display) below) using this, will be described below in detail as examples by using the accompanying drawings.

The optical functionality sheet in the embodiments described below denotes a compound sheet of any of various kinds of plastic film approximately 0.01 to 5 mm in thickness, that sheet and its substrate, a glass sheet and its substrate, an organic substance and inorganic substance.

Figure 1:
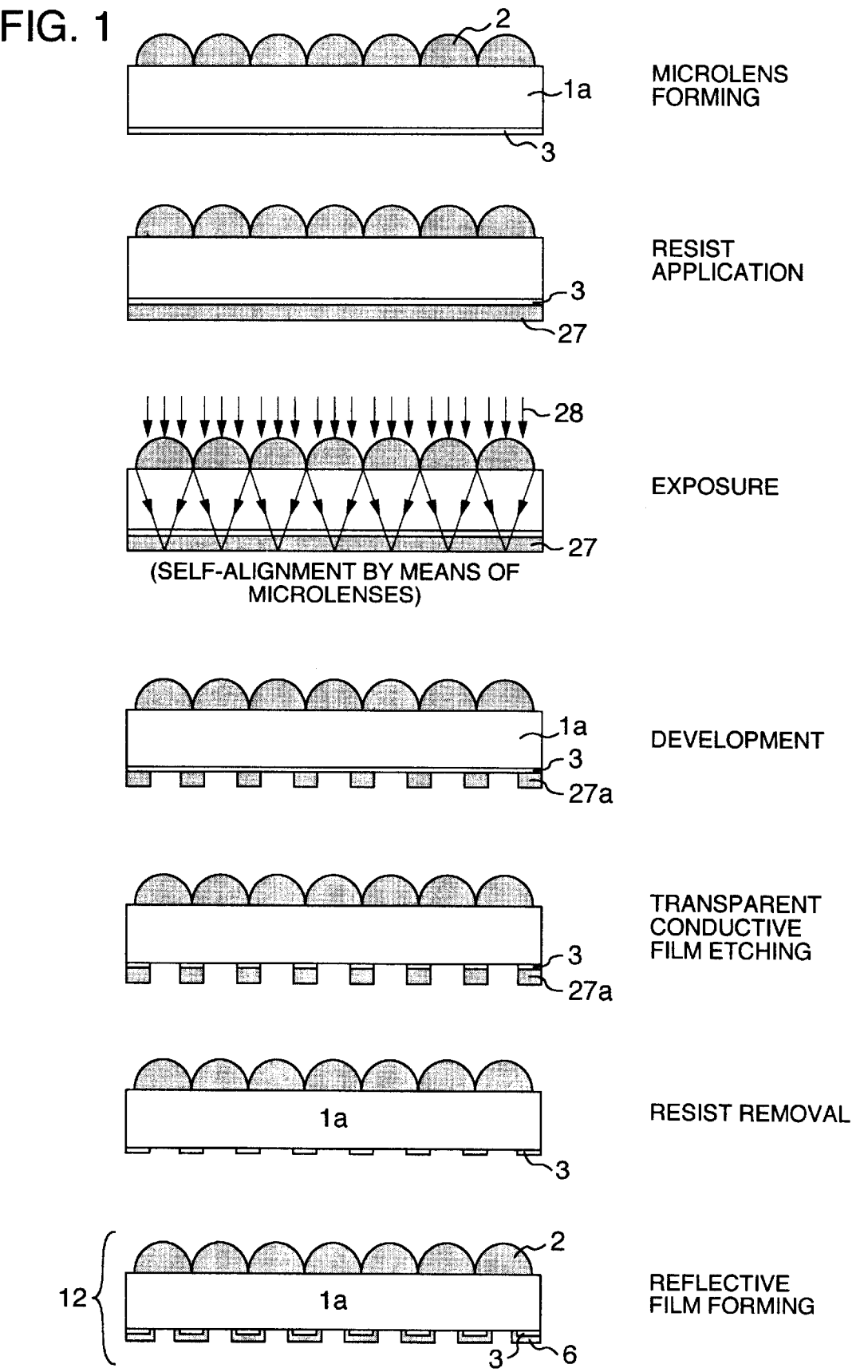
FIG. 1 is an explanatory drawing showing the construction and manufacturing process of an optical functionality sheet (light directivity characteristics) that constitutes a first embodiment.

FIG. 1 shows the configuration and manufacturing process of an optical functionality sheet that constitutes a first embodiment of the present invention.

(1) Microlens Forming

Ultraviolet-setting resin is injected between the lens grooves of an approximately 300 μm thick Ni stamper (not shown) and a transparent sheet 1a, and is hardened by irradiation with ultraviolet light, to form microlenses 2.

There are no particular restrictions as to the material of the transparent sheet 1a, as long as it is, at least, a substance that is transparent to visible light, and while glass, various kinds of plastic materials, and so forth, can be considered, use of a plastic material is desirable from the viewpoint of workability.

To be specific, desirable plastic materials are polyester resin, acrylic resin, urethane resin, epoxy resin, polycarbonate resin, polystyrene resin, TAC (triacetyl cellulose), PET (polyethylene terephthalate), PEN (polyethylene naphtalate), and compounds of these, but are not limited to these.

Also, possible methods for forming the microlenses 2 include manufacturing methods that reproduce a shape using a die or stamper, photolithography and manufacturing methods using it, and so forth, but from the viewpoint of productivity, etc., an above described manufacturing method using a die or stamper is the most desirable.

To be specific, desirable methods for microlens forming include direct lens forming methods by means of thermal pressing, extrusion forming, rolling forming, vacuum forming, and so forth, using the above described optical functionality sheet 1a—that is, methods whereby the microlenses 2 and the optical functionality sheet 1a become an integral entity, and methods whereby ultraviolet-setting resin, thermosetting resin, thermoplastic resin, etc., is selected as appropriate and formed on the optical functionality member 1a, and the shape is reproduced using a die or stamper. Of the latter methods, a method using an acrylic ultraviolet-setting resin, which offers quick setting and is also simple in terms of equipment, is desirable.

(2) Forming of Transparent Conductive Film

Next, a transparent conductive film 3 is formed on the opposite side of the transparent sheet 1a from that on which the above described microlenses 2 are formed. ITO (indium tin oxide), tin oxide, Nesa ($SnO_2$), Nesatron ($In_2O_3$), etc., can be used for the transparent conductive film, but of these ITO is the most suitable, and an ITO film can be formed using well-known sputtering or vacuum vapor deposition methods.

In order to improve the adherence to the transparent sheet 1a at this time, it is desirable to first apply a thin silica film coating, then form the ITO or other transparent conductive film upon this.

(3) Patterning of Transparent Conductive Film

A photo-resist 27 is applied upon the above described transparent conductive film. As the photoresist material, a resist of which areas exposed to light dissolve in resist remover—that is, a positive-type resist—is used. Next, parallel ultraviolet (UV) light rays 28 are projected from the microlenses 2 side, exposing only areas of the photoresist film 27 where parallel light rays are converged by the microlenses 2—that is, only areas in the vicinity of the central axes of the microlenses 2. This is called self-alignment exposure. Following this, the photo-resist film 27 is developed by immersing the transparent sheet 1a in developer. By this means, a resist pattern 27a is obtained with the resist film 27 in the vicinity of the central axes of the microlenses 2 removed. Post-baking is performed as necessary.

Next, the transparent conductive film 3 is etched. Both dry etching and wet etching are well known as etching methods, but from a productivity viewpoint, use of wet etching is desirable.

In this embodiment, etching of the transparent conductive film 3 is performed by using an HBr water solution, or an $FeCl_3$ (1N), hydrochloric acid (1N), nitric acid (1N), cerium nitrate (0.1N) mixed water solution, and a transparent conductive film 3 with the prescribed pattern is formed. Following this, unwanted resist film 27 is removed by using a strongly alkaline remover, an organic solvent, or the like. An oxygen plasma method can also be used as the lift-off method.

(4) Forming of Reflective Film

Next, a reflective film 6 is formed using an electrical method, with the above described patterned transparent conductive film 3 as an electrode.

To be specific, there is an electrodeposition method (also called migration electrodeposition) whereby an electrodeposition polymer and pigment are dispersed, and electrodeposition coating is performed using a transparent conductive film electrode. Electrodeposition coating includes anion electrodeposition and cation electrodeposition, but with anion electrodeposition, since the coated object is anode-polarized, there is a tendency to oxide elution of the electrode material, and this may lead to corrosion, discoloration of the coating, destruction of the anticorrosion coating, and so forth, and therefore cation electrodeposition is generally preferable.

The electrodeposition processing is performed by using a water soluble cation type electrodeposition coating material, with the transparent conductive film 3 as the cathode.

Materials used as an electrodeposition binder material are epoxy urethane, epoxy ester, acrylic urethane, and a cathode separation type vehicle with polyamino resin partially neutralized and deflocculated with a lower organic acid, and also a plasticizer, hardener, flattening agent, rust preventive, slobbery stain preventive, ultraviolet ray absorbent, and brightener; and as pigments, a water soluble solution containing barium sulfate, talc, calcium carbonate, clay, organic pigments, inorganic pigments, titanium white, plastic beads, or glass beads.

From the standpoint of diffuse reflection characteristics, an inorganic pigment, and a reflective material containing a metal such as a titanium oxide material, is most suitable as a pigment for the diffuse reflection film.

A supporting salt (supporting electrolyte) can be added as necessary to adjust the electrical conductivity of the aqueous medium. To be specific, suitable substances are sulfates which are generally and widely used as supporting salts (salts of lithium, potassium, sodium, rubidium, aluminum, etc.), acetates (salts of lithium, potassium, sodium, rubidium, beryllium, magnesium, calcium, strontium, barium, aluminum, etc.), halide salts (salts of lithium, potassium, sodium, rubidium, calcium, magnesium, aluminum, etc.), and water soluble oxide salts (salts of lithium, potassium, sodium, rubidium, calcium, magnesium, aluminum, etc.), of which specific examples include LiBr, KCl, $Li_2SO_4$, and $(NH_4)_3BF_4$.

In this embodiment, the transparent sheet 1a bearing the patterned transparent conductive film 3 is immersed in the above described electrodeposition solution, and electrodeposition is performed by passing a current to the above described transparent conductive film 3 electrode. The electrodeposition conditions can be selected as appropriate, according to the type, specifications, and so forth, of the reflective film concerned, but usual conditions are an applied voltage of 20 to 400 V at a temperature of 25 to 30° C. At the time of forming a reflective film 6 to a thickness of 20 to 25 $\mu$m, film forming is completed in approximately 2 to 3 minutes. In this embodiment, a reflective film 6 thickness of 1 to 30 $\mu$m is suitable.

Another reflective film forming method, other than that described above, is the micell electrolysis method. This is an electrolytic method whereby a surface active agent mixed with a micellization agent, and a pigment or dye, are dispersed in an aqueous solution, and electrolysis is performed using the transparent conductive film 3. That is, the transparent sheet 1a on which the transparent conductive film 3 has been formed is immersed in a dispersant or micell solution obtained by dispersing or solubilizing a hydrophobic substance in an aqueous medium using a surface active agent, a current is passed to the above described transparent conductive film 3 electrode, and a reflective film 6 composed of a hydrophobic substance is formed upon this conductive film 3.

Materials that can be used with this method comprise various kinds of hydrophobic substances, divided into organic substances and inorganic substances.

Hydrophobic organic substances include, for example, organic pigments, organic fluorescent materials, organic luminescent materials, and organic photosensitive materials. It is also possible to use a water insoluble polymer, for example general-purpose polymers such as polycarbonate, polystyrene, polypropylene, polyamide, polyphenylene sulfide (PPS), polyphenylene oxide (PPO), and polyacrylonitrile (PAN), and also various kinds of polymers (polyvinyl pyridine etc.) such as polyphenylene, polypyrrole, polyaniline, polythiophene, acetyl cellulose, polyvinyl acetate, and polyvinylbutyral, or copolymers (such as a copolymer of methyl methacrylate and methacrylic acid).

On the other hand, substances that can be used as hydrophobic inorganic substances include inorganic substances in which particle surfaces have been treated to make them hydrophobic, such as titanium oxide, titania, stannic oxide, etc., or inorganic pigment, inorganic phosphors, and so forth.

Although there are no particular restrictions relating to the shape, size, and so forth, of hydrophobic organic substances or inorganic substances, a powder with a particle diameter not exceeding 10 $\mu$m is preferable.

With the micell electrolysis method, various kinds of medium, including water, a mixture of water and alcohol, or a mixture of water and acetone, can be employed as the aqueous medium used for thin film formation. The surface active agent used with this method can be an ordinary surface active agent, but should preferably be made from a ferrocene derivative. Here, ferrocene derivatives include ammonium type, ether type, and ester type derivatives.

In the micell electrolysis method, the above described surface active agent and a hydrophobic organic substance or inorganic substance are first put into an aqueous medium, and are thoroughly mixed by using a mechanical homogenizer, ultrasonic homogenizer, pearl mill, sand mill, stirrer, high-pressure homogenizer, or the like. In this operation, the hydrophobic substance is uniformly dispersed or solubilized in the aqueous medium through the action of the surface active agent, and becomes a diffuse liquid or micell solution. There are no particular restrictions on the concentration of the surface active agent at this time, but normally a surface active agent, such as the above described ferrocene derivative, that has a higher concentration than the threshold micell concentration, and preferably in the range from 10 $\mu$m to 0.1 M, is selected.

A supporting salt (supporting electrolyte) can be added as necessary to adjust the electrical conductivity of the aqueous medium.

In this embodiment, the patterned transparent conductive film 3 is made the electrode, and the transparent sheet 1a including this is immersed in a diffuse liquid or micell solution prepared in this way, and electrolysis is performed by passing a current to the above described electrode. The electrolysis conditions at this time can be selected as appropriate, according to the purpose, but usual conditions are a liquid temperature of 0 to 70° C., and preferably 20 to 30° C., a voltage of 0.03 to 1.5 V, and preferably 0.1 to 0.5 V, and a current density of not more than 10 $mA/cm^2$, and preferably 50 to 300 $\mu A/cm^2$.

A protective film can also be formed by using a flattening agent, as necessary, for the thin film of hydrophobic substance formed on the transparent conductive film 3 in this way. The method is as follows. First of all, the transparent sheet 1a on which the thin film has been formed is mounted on a spin coater, and a flattening agent is thinly and evenly applied using a dispenser. A protective film can then be formed on the thin film by carrying out baking treatment for the prescribed time at the prescribed temperature to harden the flattening agent.

By means of the above described electrodeposition coating or micell electrolysis method, a reflective film 6 is formed only on the areas on which the transparent conductive film 3 has been formed, and areas with no transparent conductive film 3 become areas through which light passes.

The above described processes produce an optical functionality sheet 12. Of the light entering from the side on which the reflective film 6 has been formed, light incident upon areas on which the reflective film 6 is not formed, in the vicinity of the central axes of the microlenses, passes through the transparent sheet 1*a* and reaches the microlenses 2, and is then converted to nearly parallel light by these microlenses 2, and emitted.

As described later, when the optical functionality sheet 12 of this embodiment is applied to a backlight for a liquid crystal display, light incident upon the reflective film 6 from the backlight is reflected there, returns to the backlight side, is reflected by the reflective plate of the backlight, etc., and again becomes light incident upon the optical functionality sheet. Through repetition of this process, the majority of the light emitted from the backlight ultimately becomes light incident upon areas on which reflective film 6 is not formed, enabling outgoing light to be obtained efficiently from the microlenses 2.

Figure 2:
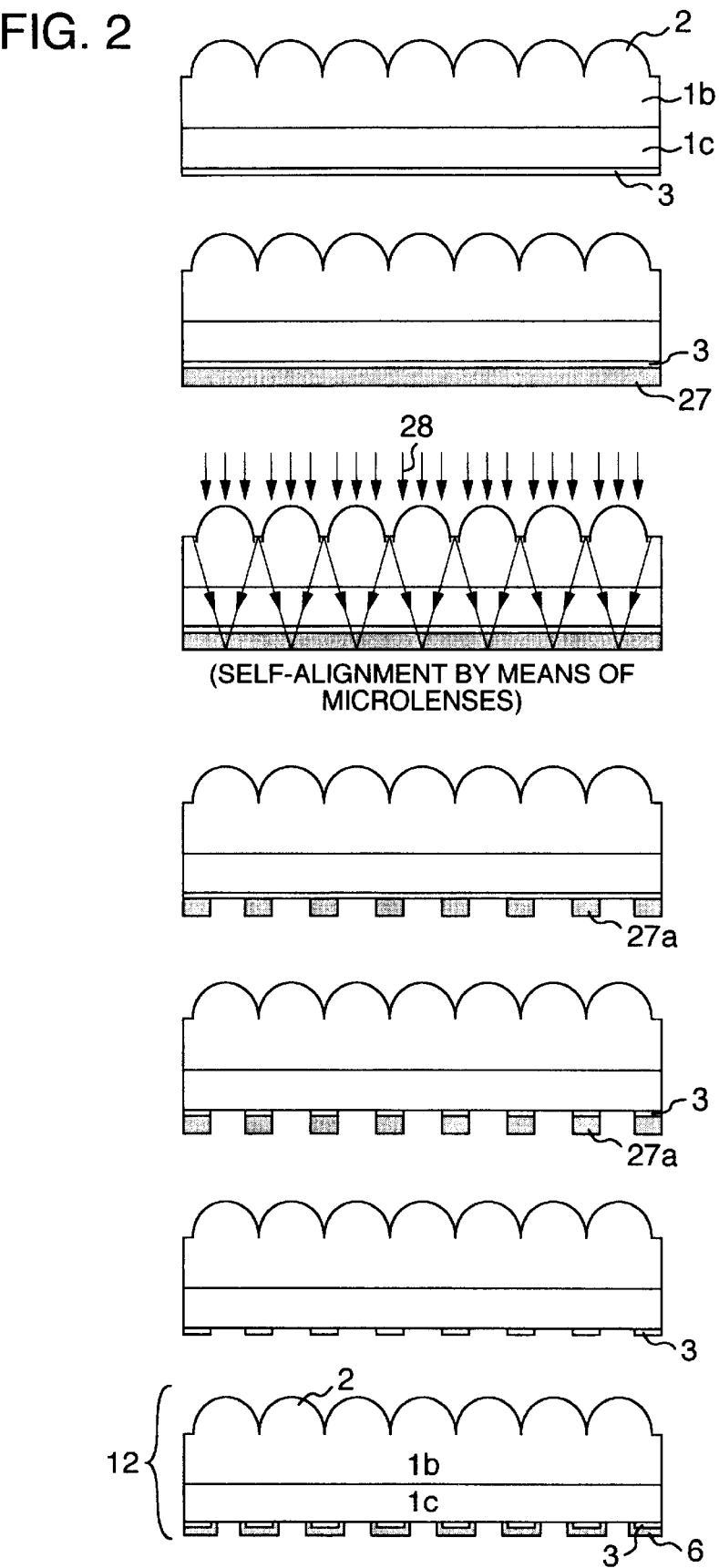
FIG. 2 is an explanatory drawing showing the construction and manufacturing process of an optical functionality sheet (light directivity characteristics) that constitutes a second embodiment.

Next, the construction and manufacturing process of an optical functionality sheet that constitutes a second embodiment will be described using FIG. 2.

(1) Microlens Forming

Using an Ni stamper (not shown) that has the shape of the microlenses, a microlens sheet 1*b* is formed by direct deformation of a plastic sheet, for example. The well-known hot rolling formation method is used as the lens forming method here. The obtained microlens sheet 1*b* is similar to the sheet integrating microlenses 2 and a transparent sheet 1*a* described in the first embodiment.

(2) Forming of Transparent Conductive Film

Using the method described in the first embodiment—that is, ITO sputtering—a transparent conductive film 3 is formed upon a transparent sheet 1*c*.

Next, the transparent sheet 1*c* on which this transparent conductive film 3 is formed and the microlens sheet 1*b* on which the microlenses 2 are formed are joined together with the respective formed surfaces outward. This joining can be accomplished by using a commonly used adhesive, or by using a method such as thermal fusion or lamination of the sheets.

(3) Patterning of Transparent Conductive Film

A positive-type resist film 27 is formed upon the transparent conductive film 3 by means of the usual well-known method, and patterning of the transparent conductive film 3 is performed by using the method shown in the first embodiment.

(4) Forming of Reflective Film

A reflective film 6 is formed by using the method described in the first embodiment—that is, electrodeposition coating with titanium oxide as the pigment. This reflective film 6 is a white diffuse reflection film containing titanium oxide, with a high reflectance ratio of at least 94% in the 400 to 700 nm wavelength range.

The above described processes produce an optical functionality sheet 12. Since formation of the microlenses 2 and formation of the transparent conductive film 3 can be performed by means of separate processes, this embodiment offers the advantage of enabling the transparent conductive film 3 to be formed without causing unnecessary damage through processing to the microlenses 2.

When the optical functionality sheet 12 of this embodiment is applied to a backlight for a liquid crystal display, light incident upon the reflective film 6 from the backlight is reflected there, returns to the backlight side, is reflected by the reflective plate of the backlight, etc., and again becomes light incident upon the optical functionality sheet. Through repetition of this process, the majority of the light emitted from the backlight ultimately becomes light incident upon areas on which reflective film 6 is not formed, enabling outgoing light to be obtained efficiently from the microlenses 2.

Next, a third embodiment will be described by using FIG. 3.

Figure 3:
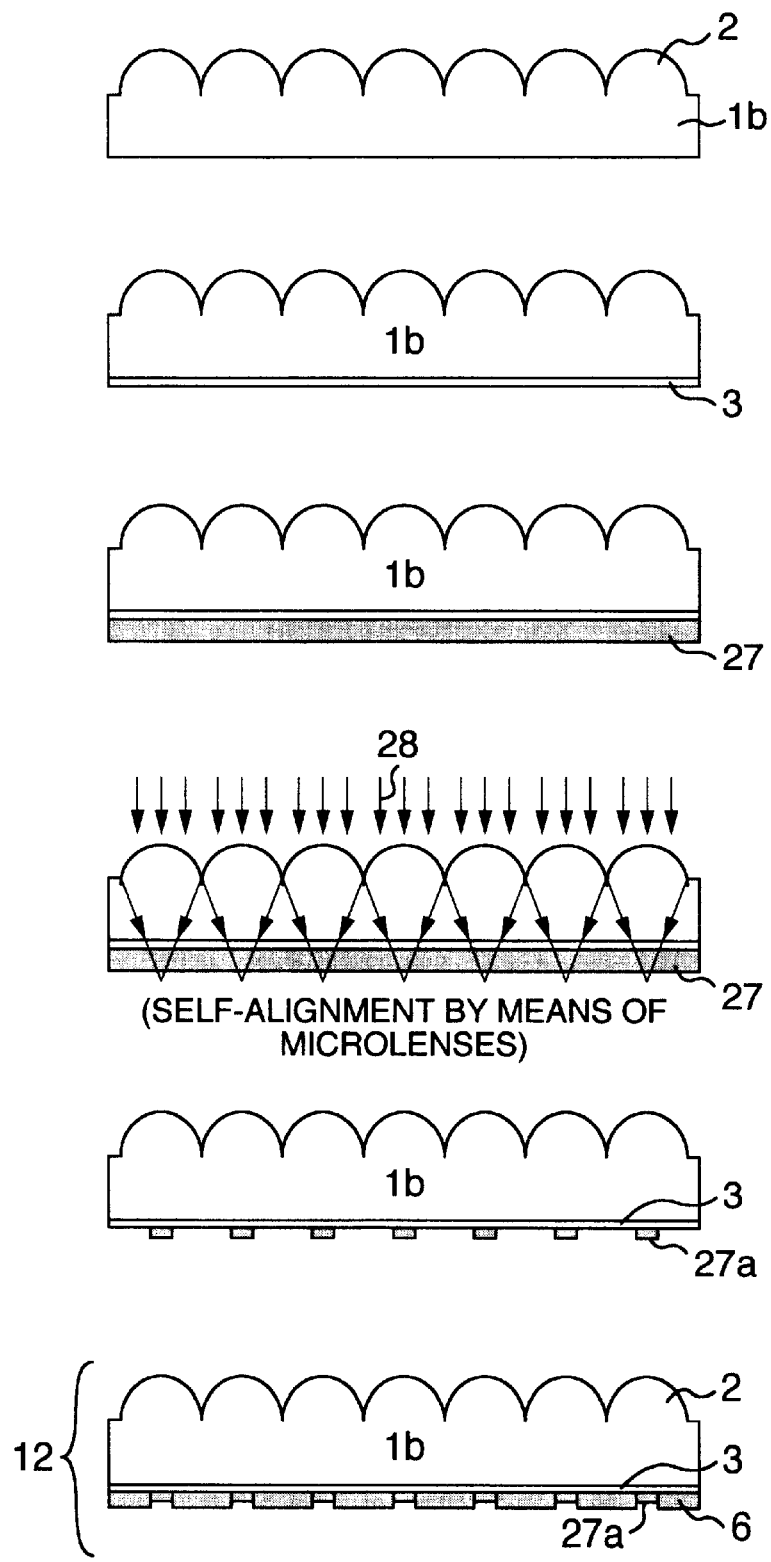
FIG. 3 is an explanatory drawing showing the construction and manufacturing process of an optical functionality sheet (light directivity characteristics) that constitutes a third embodiment.

FIG. 3 shows the construction and manufacturing process of an optical functionality sheet that constitutes the third embodiment of the present invention. The details of (1) Microlens forming and (2) Forming of transparent conductive film, are the same as in the methods described in the second embodiment, and are therefore omitted.

(3) Patterning of Transparent Conductive Film

A negative-type resist film 27 is applied upon the transparent conductive film 3 so as to produce chemical bridging of parts not irradiated with light. In this embodiment, a material of especially high transparency is used as the photo-resist film 27.

Next, parallel light rays 28 are irradiated from the side on which the microlenses 2 are formed, and the photo-resist film 27 is exposed only where the parallel light rays converge. The transparent sheet 1*b*, including the photo-resist film 27, is then immersed in developer, and the photo-resist film 27 is developed. Through this processing, a resist film pattern 27*a* is obtained in which the resist film 27 has been removed except in the vicinity of the focal points of the microlenses 2. Post-baking of the resist film pattern 27*a* may also be performed as necessary.

(4) Forming of Reflective Film

A diffuse reflection film 6 is formed by using the micell electrolysis method described in the first embodiment, in which a micell electrolyte with titania admixed is used as a hydrophobic inorganic substance.

In this embodiment, the above described diffuse reflection film 6 is formed on areas of the transparent conductive film 3 on which none of the negative-type photo-resist pattern 27*a* remains. The negative-type photo-resist pattern 27*a* can then be removed, as necessary, after the diffuse reflection film 6 has been formed.

The above described processes produce an optical functionality sheet 12. By placing this optical functionality sheet 12 so that the surface on which the reflective film 6 has been formed faces the light-emitting surface side of the backlight, and the surface on which the microlenses 2 have been formed faces the liquid crystal display element side, as shown in FIG. 3, the majority of the light emitted from the backlight becomes light incident upon areas on which reflective film 6 is not formed, enabling outgoing light to be obtained efficiently from the microlenses 2.

Next, a fourth embodiment will be described by using FIGS. 4A–4E.

The optical functionality sheet 12 construction method conforms to the method described in the first through third embodiments.

Figure 4A:
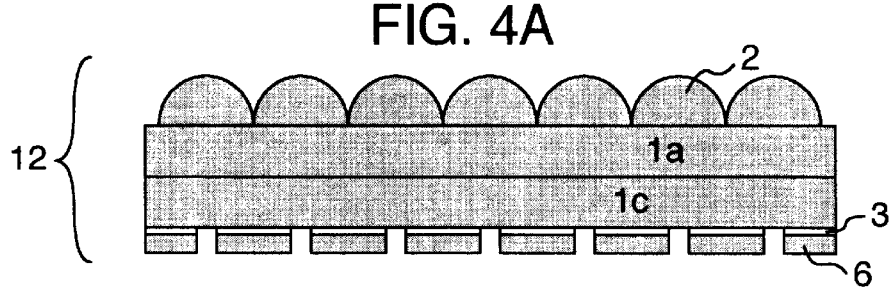
FIGS. 4A–4E are explanatory drawings showing the construction and manufacturing process of an optical functionality sheet (light directivity characteristics) that constitutes a fourth embodiment.

FIG. 4A shows a structure in which a transparent sheet 1*a* including microlenses 2 created by means of the method shown in the first embodiment, and a transparent sheet 1*c* on which a transparent conductive film 3 has been formed, are joined together.

Figure 4B:
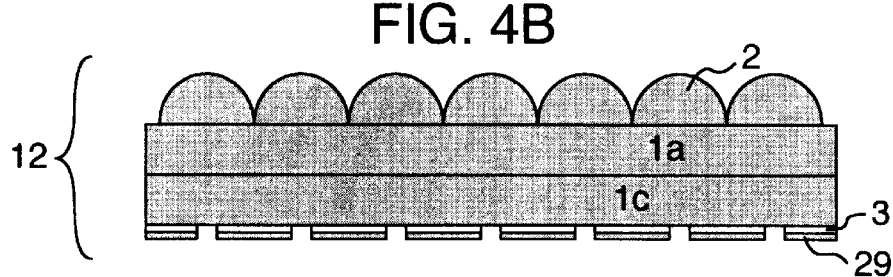

In FIG. 4B, with the transparent conductive film 3 as an electrode, a metal film 29, formed thereupon using an electrical method, is used for the reflective film 6. A metal with a high reflectance ratio for light, such as Al, Ni, or Ag, is used for this metal film 29, which is formed by means of the well-known metal plating method.

By using a metal film 29 with an extremely high reflectance ratio, as described above, reflected light from the liquid crystal display elements positioned opposite is reflected by the metal film 29, and that light can be returned again to the liquid crystal display element side, with the end result that the usage efficiency of the light from the backlight is improved, and consequently, high brightness of the liquid crystal display apparatus is achieved.

Especially in a liquid crystal display apparatus with a configuration whereby a selective-polarization reflective sheet is fitted between the optical functionality sheet 12 and the liquid crystal display elements, the brightness improving effect of the above described selective-polarization reflective sheet is magnified, and increased brightness of the liquid crystal display apparatus is facilitated.

Figure 4C:
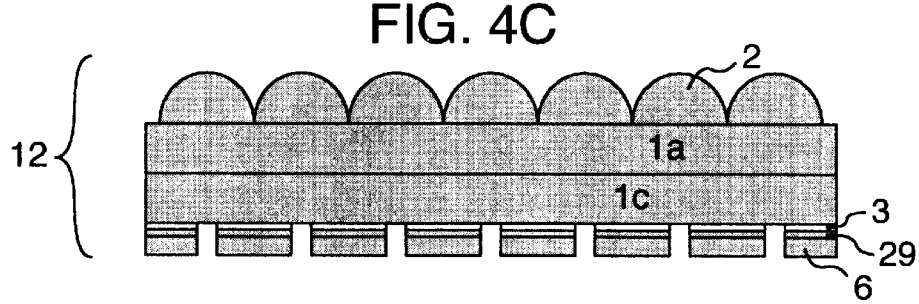

FIG. 4C shows sequential lamination of the patterned transparent conductive film 3, metal film 29, and white diffuse reflection film 6 on the transparent sheet 1c. Each film is formed by an electrical method, with the transparent conductive film as an electrode.

Using the above described configuration enables reflected light that is reflected back from the liquid crystal display elements to be reflected by the metal film 29 and returned again to the liquid crystal display element side, and incident light from the photoconductive plate to be reflected by the white diffuse reflection film 6 and returned to the backlight side. By this means, a higher order of brightness is realized than when this embodiment is not used.

Figure 4D:
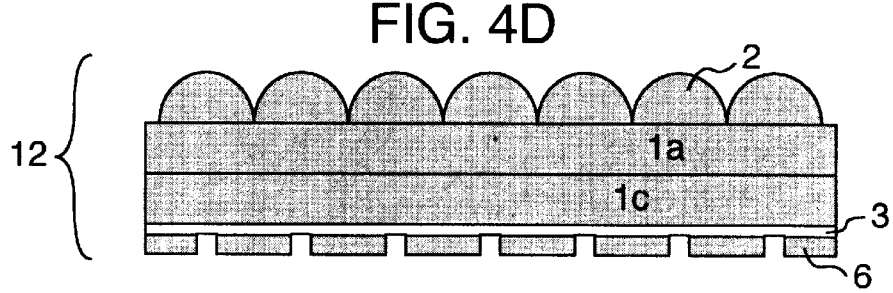

The sheet in FIG. 4D is created by using the method described in the third embodiment. That is, a negative-type photo-resist 27 is first patterned, then a reflective film 6 is applied by electrodeposition coating, and the negative-type photo-resist 27 is then removed to complete the process.

Figure 4E:
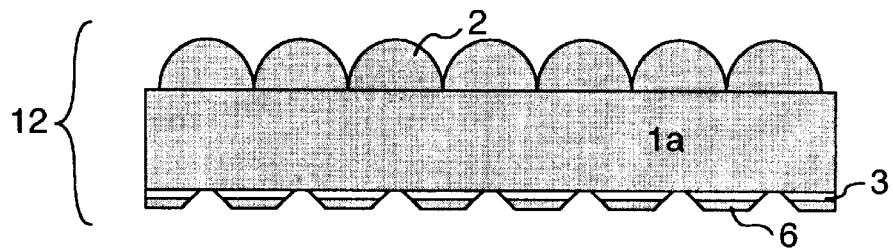

FIG. 4E shows an optical functionality sheet 12 in which a reflective film 6 including a transparent conductive film 3 is processed into trapezoid shapes by an electrodeposition coating technique. Use of these shapes enables the light emitted from the backlight to be input efficiently to the microlenses 2.

When the optical functionality sheet 12 of this embodiment is applied to a backlight for a liquid crystal display, light incident upon the reflective film 6 from the backlight is reflected there, returns to the backlight side, is reflected by the reflective plate of the backlight, etc., and again becomes light incident upon the optical functionality sheet. Through repetition of this process, the majority of the light emitted from the backlight ultimately becomes light incident upon areas on which reflective film 6 is not formed, enabling outgoing light to be obtained efficiently from the microlenses 2.

Figure 5:
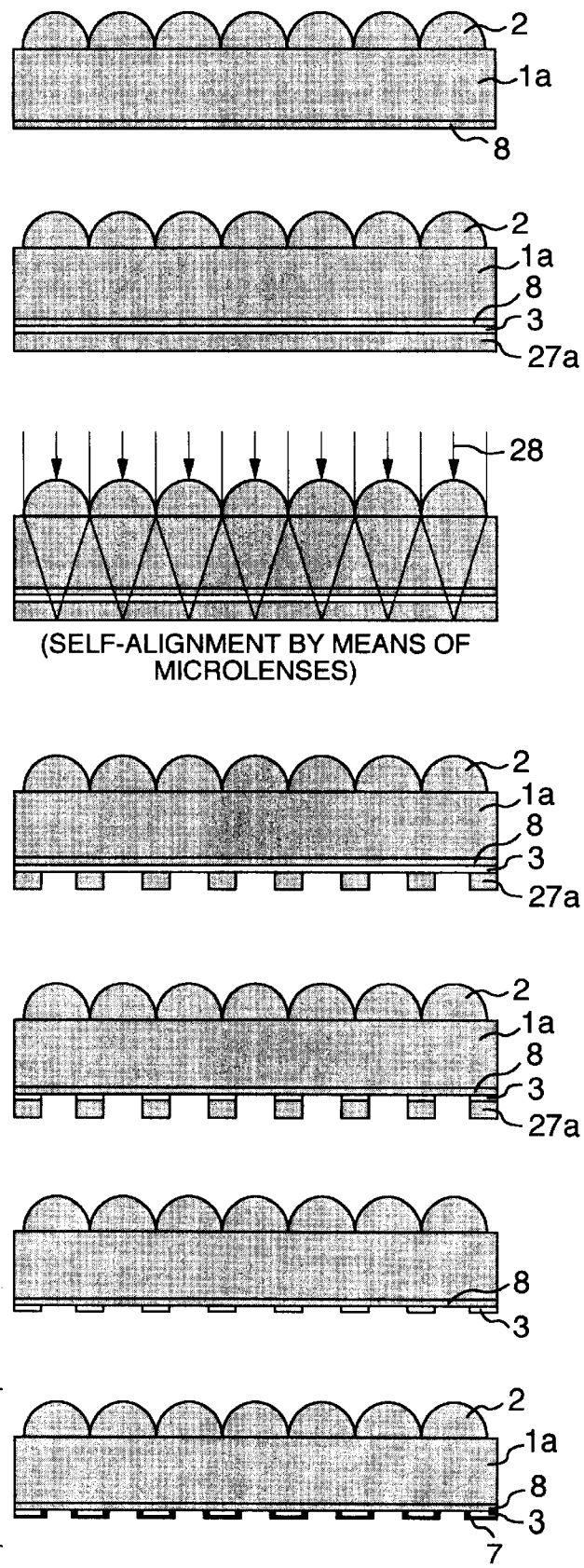
FIG. 5 is an explanatory drawing showing the construction and manufacturing process of an optical functionality sheet (angle of visibility enlargement characteristics) that constitutes a fifth embodiment.

Next, a fifth embodiment will be described using FIG. 5. The optical functionality sheet shown in this embodiment has as its objective enlargement of the angle of visibility. The construction and manufacturing process of this sheet will be described below.

(1) Microlens Forming

A light-diffusing layer 8 is formed on one surface of a transparent sheet 1a by means of light diffusion processing (a processing method that forms randomly shaped irregularities), and microlenses 2 are formed on the other surface of this transparent sheet 1a (commonly called PET film, with a typical thickness of 80 $\mu$m). The method of forming the microlenses 2 is to inject ultraviolet-setting resin, for example, between the lens grooves of an Ni stamper that has the shape of the microlenses (not shown) and the transparent sheet 1a, and harden this by irradiation with ultraviolet light.

(2) Forming of Transparent Conductive Film

A transparent conductive film 3 is formed upon the light-diffusing layer 8 using the method described in the first embodiment. A stannic oxide film ($SnO_2$) is used as the material of the transparent conductive film.

(3) Patterning of transparent conductive film

The method shown in the first embodiment is used for patterning of the transparent conductive film using a positive-type resist film. The details are omitted here.

(4) Forming of Light-Blocking Film

Using the method described in the first embodiment, a light-blocking film 7 is formed on the parts on which the transparent conductive film 3 has been formed. An electrodeposition coating material with black pigment admixed is used for the electrodeposition coating for forming the light-blocking film 7.

By this means, an optical functionality sheet 18 enabling the angle of visibility to be enlarged (referred to as "angle of visibility enlargement sheet" below) is created.

As will be described later, when, for example, the microlens formation surface of the angle of visibility enlargement sheet 18 is positioned on the liquid crystal display element side so that the surface on which the light-blocking layer is formed is toward the viewer, light passing through the liquid crystal display elements is converged by the microlenses 2, then diffused by the light-diffusing layer 8, and is emitted from the aperture areas (areas where a light-blocking layer 7 has not been formed) in the vicinity of the central axes of the microlenses 2. At this time, the outgoing light has an angle of divergence in accordance with the NA of the microlenses 2 and the characteristics of the light-blocking layer 7, and as a result, it is possible to obtain a liquid crystal display image exhibiting characteristics of a wider angle of visibility and higher contrast than when this embodiment is not used.

Figure 6:
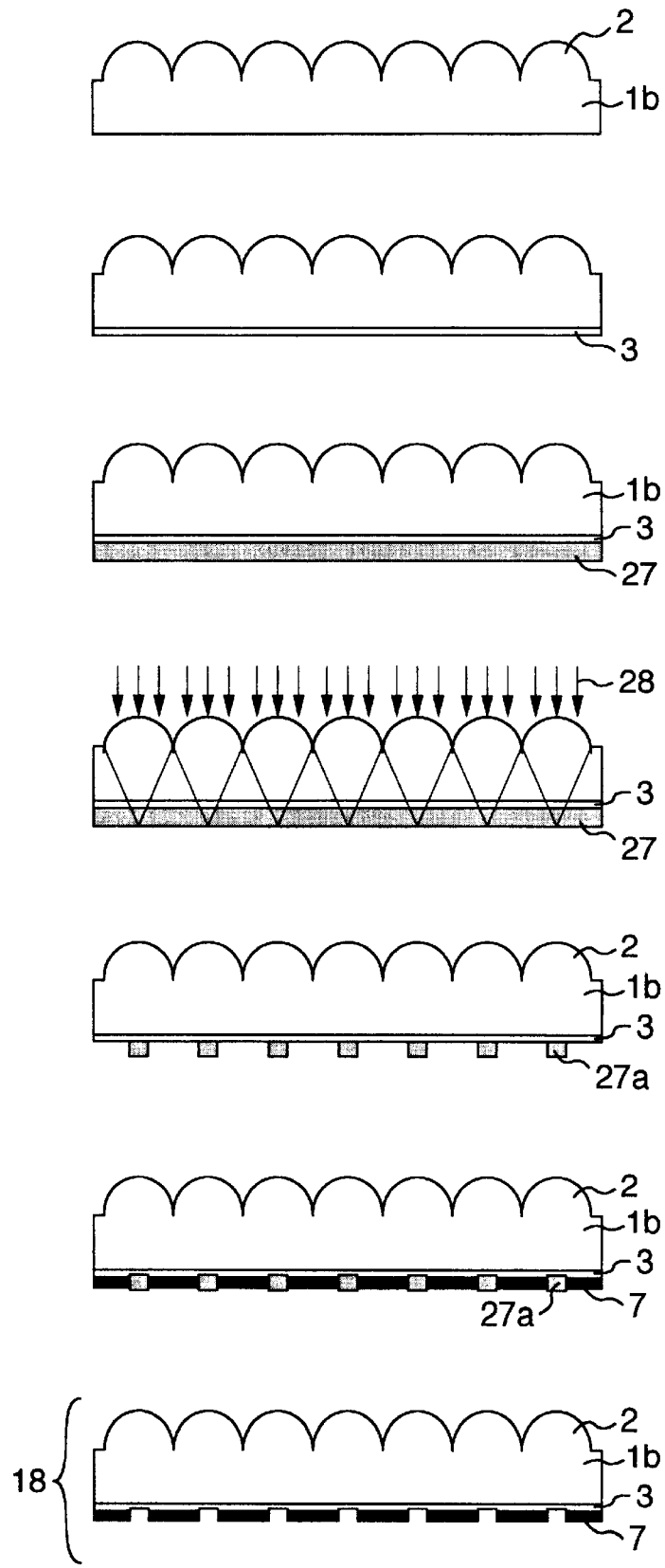
FIG. 6 is an explanatory drawing showing the construction and manufacturing process of an optical functionality sheet (angle of visibility enlargement characteristics) that constitutes a sixth embodiment.

Next, another embodiment of an angle of visibility enlargement sheet will be described, as a sixth embodiment, using FIG. 6

(1) Microlens Forming

A plastic sheet (for example polycarbonate film, with a thickness of approximately 50 $\mu$m) is deformed directly, using an Ni stamper on which microlens shapes are formed, and a transparent sheet 1b bearing microlenses 2 is created. The well-known hot rolling formation method is used as the microlens 2 forming method.

The microlens sheet obtained by the above described process is an integral entity combining the microlenses 2 and transparent sheet 1b.

(2) Forming of Transparent Conductive Film

By using the method described in the first embodiment, a transparent conductive film 3 is formed upon the surface of the transparent sheet 1b on which the microlenses 2 have not been formed.

(3) Patterning of Transparent Conductive Film

The method shown in the first embodiment is used for patterning of the transparent conductive film 3 using a positive-type resist. That is, a resist pattern 27a is formed by performing self-alignment exposure using parallel ultraviolet light rays 28 through the use of the microlenses 2, and development processing. Etching is then performed on the transparent conductive film 3, and the transparent conductive film 3 is patterned.

(4) Forming of Light-Blocking Film

Forming of the light-blocking film 7 is performed by using the method described in the first embodiment. That is, an electrodeposition coating technique is used, and an electrodeposition coating material with black pigment admixed is used for the electrodeposition coating for forming the light-blocking film.

By means of the above method, an angle of visibility enlargement sheet 18 can be obtained.

The effect obtained when the above described angle of visibility enlargement sheet 18 is used is similar to the case of the fifth embodiment, and when, for example, the microlens formation surface of the angle of visibility enlargement sheet 18 is positioned on the liquid crystal display element side so that the surface on which the light-blocking layer is formed is toward the viewer, light passing through the liquid crystal display elements is converged by the microlenses 2, then diffused by the light-diffusing layer 8, and is emitted from the aperture areas (areas where a light-blocking layer 7 has not been formed) in the vicinity of the central axes of the microlenses 2.

At this time, the outgoing light has an angle of divergence in accordance with the NA of the microlenses 2 and the characteristics of the light-blocking layer 7, and as a result, it is possible to obtain a liquid crystal display image exhibiting characteristics of a wider angle of visibility and higher contrast than when this embodiment is not used.

Figure 7:
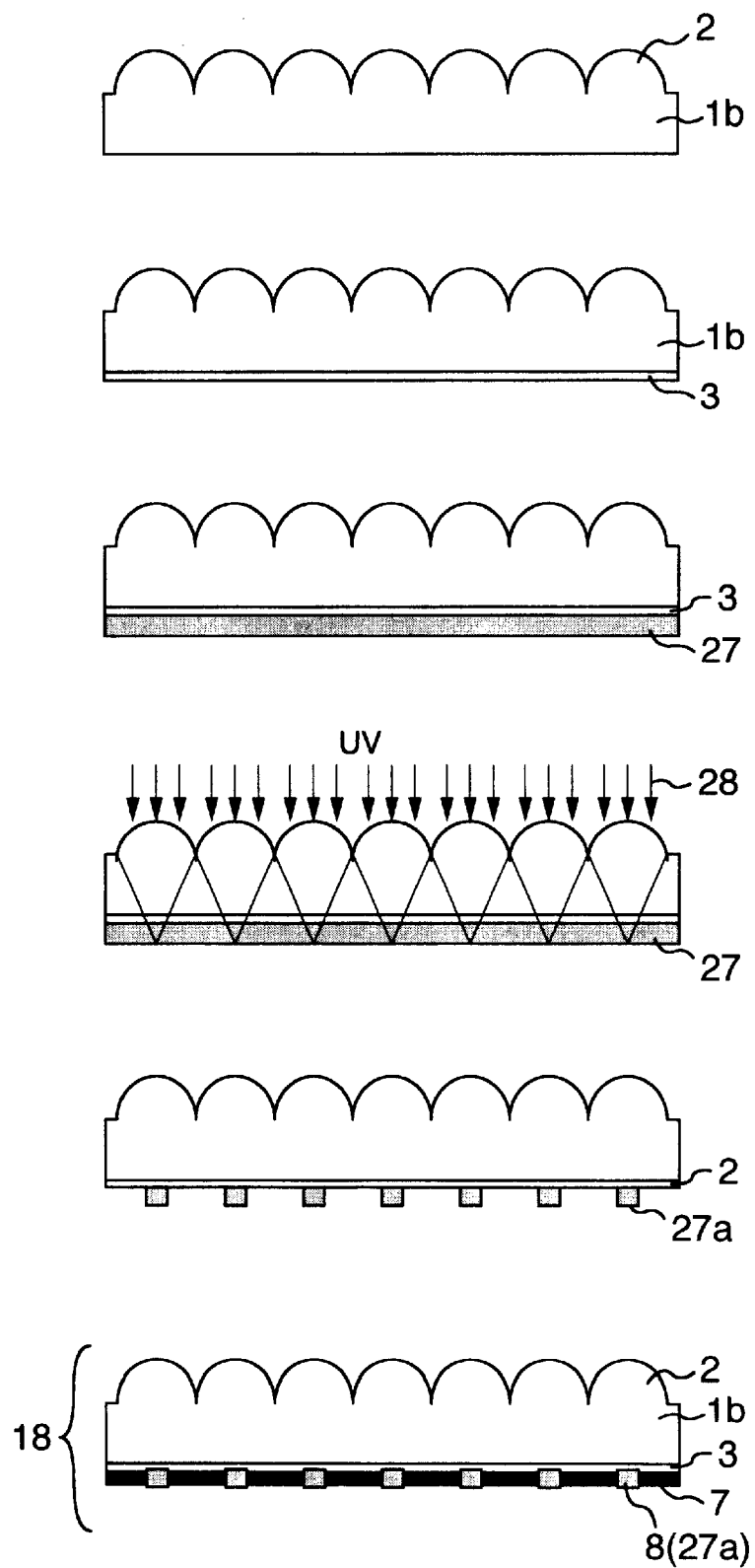
FIG. 7 is an explanatory drawing showing the construction and manufacturing process of an optical functionality sheet (angle of visibility enlargement characteristics) that constitutes a seventh embodiment.

Next, another embodiment of an angle of visibility enlargement sheet will be described, using FIG. 7

(1) Microlens Forming

A TAC film (thickness: 30 μm), for example, is used as a transparent sheet 1b, and microlenses 2 are formed on its surface. The well-known hot pressing method, using an Ni stamper (not shown) on which microlens shapes are formed, is used as the microlens forming method.

(2) Forming of Transparent Conductive Film

The method described in the first embodiment is used for forming of the transparent conductive film in this embodiment.

(3) Patterning of Transparent Conductive Film

Patterning is performed by means of the method described in the third embodiment, using a highly-transparent negative-type resist that contains a light-diffusing substance (for example a substance with plastic or glass beads admixed). By means of self-alignment exposure and development, a negative-type resist pattern 27a with a light diffusing function is formed.

(4) Forming of Light-Blocking Film

By using the method described in the first embodiment, a light-blocking layer 7 is formed upon the areas of the transparent conductive film 3 where the negative-type resist pattern 27a has been formed. In this embodiment, micell electrolysis is used, and a coating material with a black pigment admixed is used as the micell electrolytic coating material for forming the light-blocking film.

By means of the above described method, an angle of visibility enlargement sheet 18 can be obtained. Due to the synergy of the microlenses 2 and the light-diffusing layer 8, this sheet 18 exhibits a greater angle of visibility enlargement effect than when this embodiment is not used. As will be described later, when the angle of visibility enlargement sheet 18 of this embodiment is applied to the screen of a rear-projection type liquid crystal projector, for example, an image with a wide angle of visibility and high contrast can be obtained on a large screen.

Figure 8:
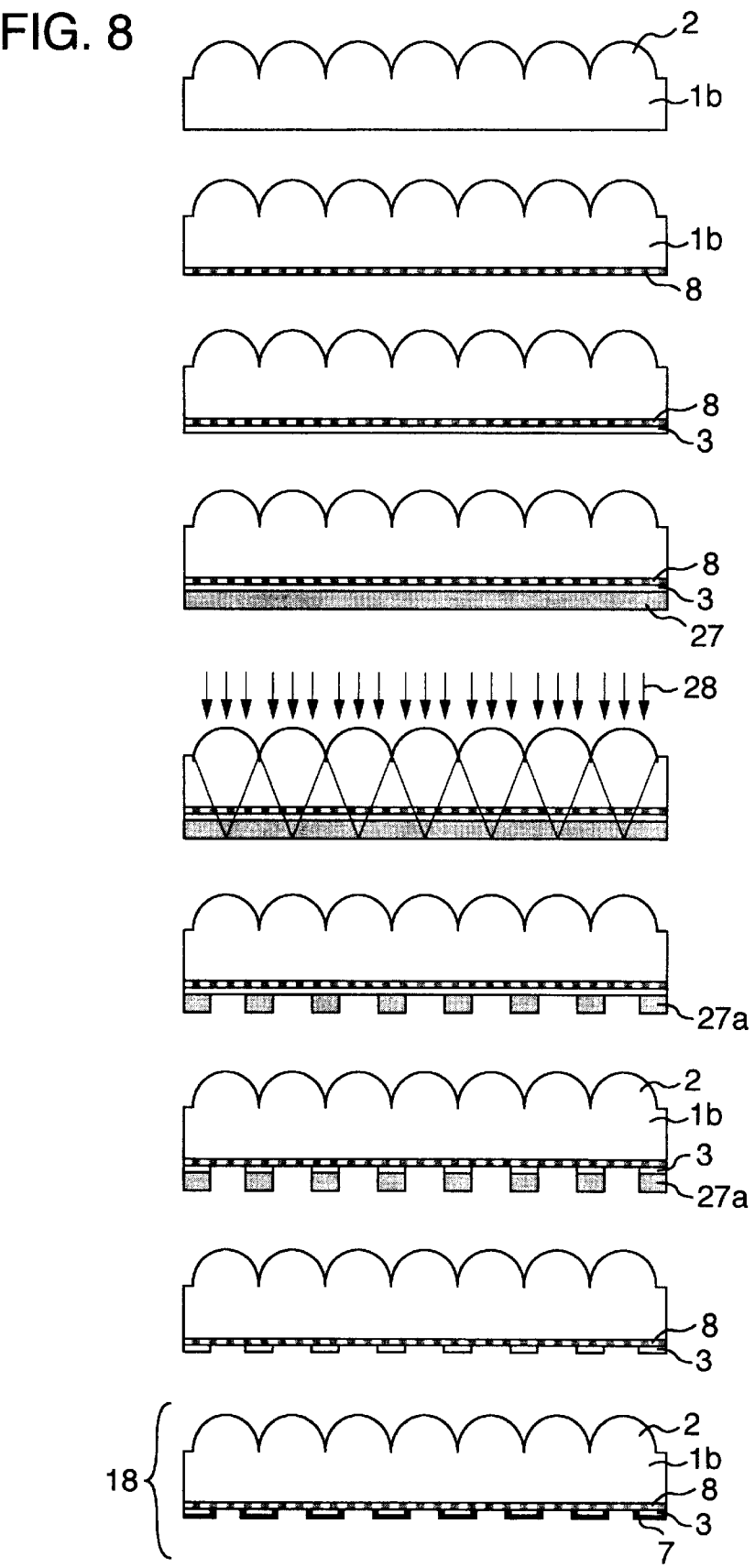
FIG. 8 is an explanatory drawing showing the construction and manufacturing process of an optical functionality sheet (angle of visibility enlargement characteristics) that constitutes an eighth embodiment.

Next, another embodiment of an angle of visibility enlargement sheet will be described, using FIG. 8.

(1) Microlens Forming

A polycarbonate film, for example, is used as a transparent sheet 1b, and microlenses 2 are formed on its surface. The well-known hot pressing method, using an Ni stamper (not shown) on which microlens shapes are formed, is used as the microlens forming method.

Next, ultraviolet-setting resin containing plastic beads, for example, is applied to the surface on which microlenses 2 have not been formed, then the above described resin is hardened by irradiation with ultraviolet light, and a light-diffusing layer 8 is formed.

(2) Forming of Transparent Conductive Film

A transparent conductive film 3 is formed upon the light-diffusing layer 8, using the method described in the first embodiment.

(3) Patterning of Transparent Conductive Film

The transparent conductive film 3 is patterned by means of the method described in the first embodiment, using a positive-type resist film. That is, a resist pattern 27a is obtained by performing self-alignment exposure using parallel ultraviolet light rays 28 through the use of the microlenses 2, and development processing. The transparent conductive film 3 is then patterned using the well-known wet etching method.

(4) Forming of Light-Blocking Film

By using the method described in the first embodiment, a light-blocking layer 7 is formed on areas where the transparent conductive film 3 has been formed. In this embodiment, micell electrolysis is used, and a coating material with a black pigment admixed is used as the micell electrolytic coating material for forming the light-blocking film.

By means of the above described method, an angle of visibility enlargement sheet 18 can be obtained. Due to the synergy of the microlenses 2 and the light-diffusing layer 8, this sheet 18 exhibits a greater angle of visibility enlargement effect than when this embodiment is not used. As will be described later, when the angle of visibility enlargement sheet 18 of this embodiment is applied to the screen of a rear-projection type liquid crystal projector, for example, an image with a wide angle of visibility and high contrast can be obtained on a large screen.

Various kinds of processing can be performed for the optical functionality sheet described above, such as reflection prevention or electrostatic charge prevention on the surface of the microlenses 2 or the upper surface on which the reflective film 6 and light-blocking film 7 are formed, or hard-coat film or adhesive layer application processing, according to its use and required characteristics. In addition, the sheet can also be used bonded to another base material (such as a plastic or glass substrate, for example).

Now, with the above described optical functionality sheet in the first through fourth embodiments, when light with various directions of travel entering from the surface on which the microlens group is formed passes through the above described optical sheet, and is emitted to the other surface on which a reflective film composed of a transparent conductive film and white diffuse reflection film is formed, the optical functionality sheet can give directivity to the outgoing light, emitting nearly parallel light, for example, and at least, areas in the vicinity of the focal points of light entering from the microlens group side are made apertures.

An embodiment (planar light source) in which the above described optical functionality sheet is applied to a backlight for a TFT-LCD, which is one of its typical uses, will be described below.

The backlight referred to here is a light source for shining light uniformly onto a TFT-LCD from the rear. There is an edge-light type and a directly-beneath type, according to the location of the light source with respect to the display surface of the TFT-LCD.

Figure 9:
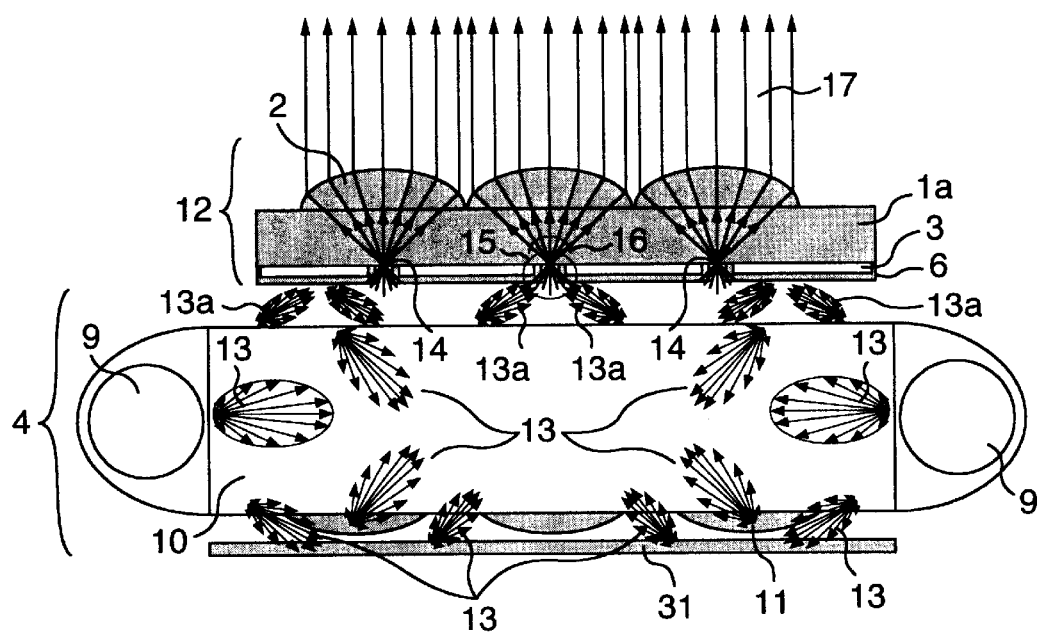
FIG. 9 is an explanatory drawing showing an embodiment of a planar light source using an optical functionality sheet.

With the edge-light type backlight shown in FIG. 9, basically cold cathode tubes 9, which are line light sources, are installed at the sides of a photoconductive plate 10 of excellent transparency installed opposite the display surface of a TFT-LCD (not shown), light from the cold cathode tubes 9 is scattered using dots 11 provided on the bottom surface of this photoconductive plate 10, and light is emitted toward the display surface of the TFT-LCD (the top of the page in FIG. 9).

With the optical functionality sheet 12, an edge-light type or directly-beneath type backlight need not be specially modified; it is possible for light that has directivity to be emitted to the TFT-LCD by placing the sheet opposite the light emitting surface of the backlight—that is, the photoconductive plate 10.

Next, the function and effect will be described for the case where the above described optical functionality sheet 12 is mounted on an edge-light type of upper-surface-scatter type backlight, as shown in FIG. 9.

Of the light 13 that is repeatedly reflected inside the photoconductive plate 10, light is emitted externally at various angles as light 13a from the emitting surface (the surface on which dots 11 are not formed) of the photoconductive plate 10.

Then, since the transparent conductive film 3 and reflective film 6 formed on the optical functionality sheet 12 are located opposite this surface, the light 13a incident upon this reflective film 6 is reflected by that reflective film 6 and returned to the photoconductive plate 10 again.

This light again follows the above described path, and the final result is that loss is kept to a minimum for the light emitted from the cold cathode tubes 9. Also, the light 13 emitted toward the bottom of the photoconductive plate 10 is reflected by a reflective sheet 31, and returns again to the photoconductive plate 10.

On the other hand, the transparent conductive film 3 and reflective film 6 have apertures 15 in the vicinity of the focal points of the microlenses 2, or in the vicinity of the central axes of the microlenses 2, and light 16 incident upon these apertures 15 is refracted by the microlenses 2, and becomes light 17 that has directivity—that is, nearly parallel light—and is emitted toward the display surface of the TFT-LCD (not shown).

By changing the shape of the apertures 15 and microlenses 2, the thickness of the transparent sheet 1a used for lens forming, and so on, as appropriate, it is possible to optimize the degree of light directivity, its direction, and so forth, according to the intended application or use.

It is also possible to place a plurality of diffusion sheets, prism sheets, or the like, between the photoconductive plate 10 and the optical functionality sheet 12, for the purpose of further optimizing the directivity of the light 13 emitted from the cold cathode tubes 9.

Figure 10:
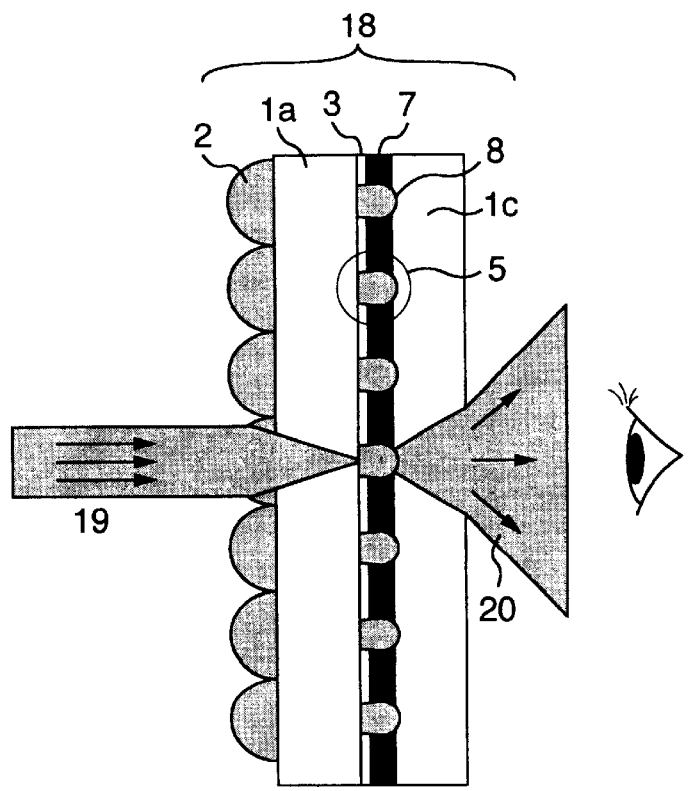
FIG. 10 is an explanatory drawing showing an embodiment of angle of visibility enlargement characteristics using an optical functionality sheet.

The purpose of the above described optical functionality sheet in the fifth through eighth embodiments is to enlarge the angle of visibility of light emitted from the display unit of a TFT-LCD (not shown), and a embodiment in which it is applied to enlarging the angle of visibility of a TFT-LCD, which is a typical use, will now be described using FIG. 10.

The surface of an optical functionality sheet 18 on which microlenses 2 are formed is located opposite the display surface side of a TFT-LCD, and nearly parallel image light 19 emitted from the display surface of the TFT-LCD is converged at transparent areas 5 by the microlenses 2, is then diffused by a light-diffusing layer 8, and then strikes a transparent sheet 1c.

The image light 19 incident upon the transparent sheet 1c is refracted at the boundary between the air and the transparent sheet 1c, and is emitted externally. Since, at this time, the image light 19 is converged by the microlenses 2 before being emitted, it becomes divergent image light 20 that has an angle of divergence in accordance with the NA of the microlenses 2 and the characteristics of the light-diffusing layer 8. It is thus possible to obtain image light 20 with a wide angle of visibility.

On the other hand, the influence of detrimental external light on the visibility of the image, which is one factor in TFT-LCD display quality, can be suppressed by forming a light-blocking film 7 constituting a component of the angle of visibility enlargement sheet 18, using a black light absorber, and as a result, it is possible to display TFT-LCD images with improved contrast.

Next, a embodiment in which the above described optical functionality sheet is applied to a liquid crystal display apparatus will be described, by using FIG. 11.

Figure 11:
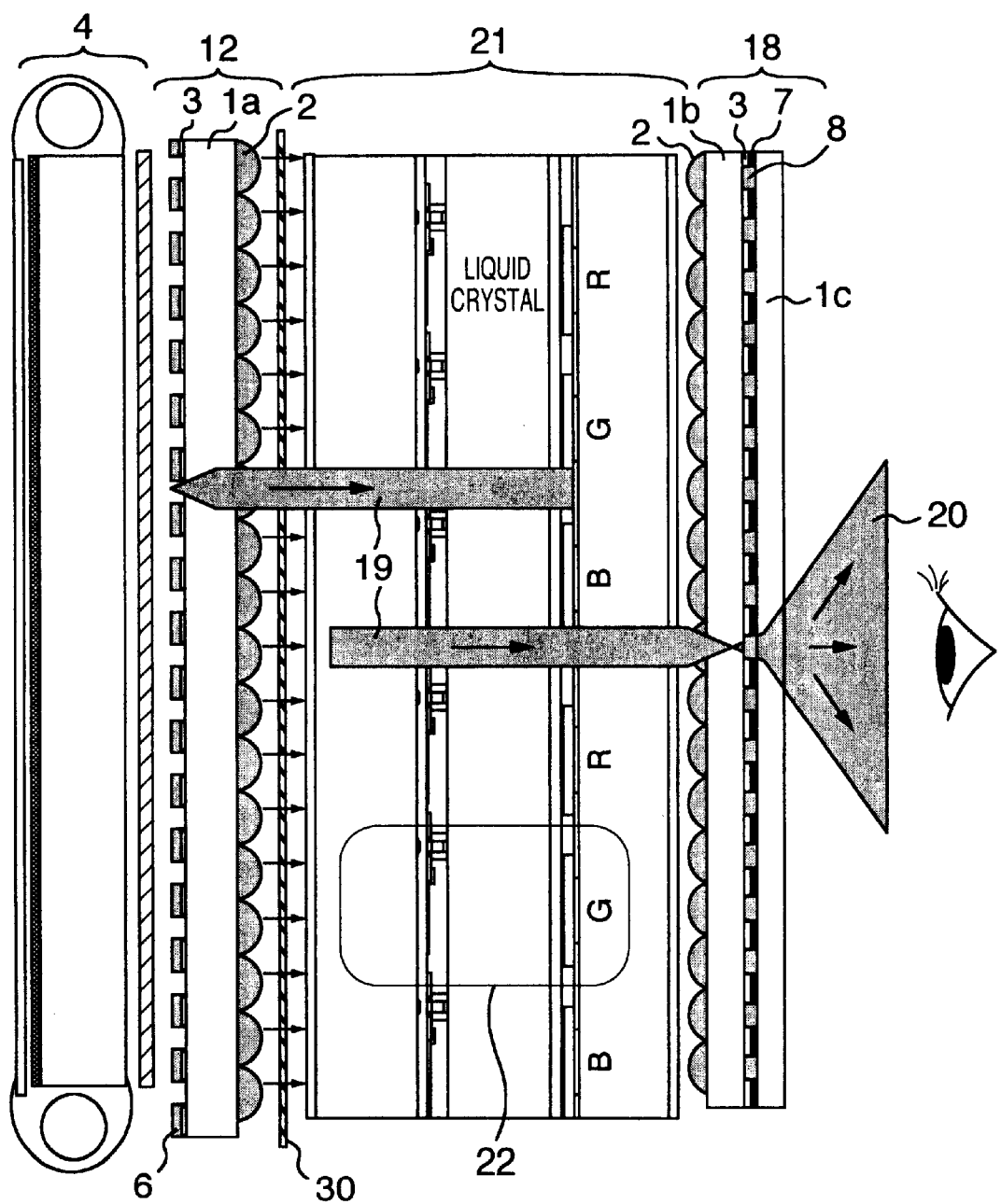
FIG. 11 is an explanatory drawing showing an embodiment of a liquid crystal display apparatus.

The liquid crystal display apparatus shown in FIG. 11 comprises a backlight unit 4, a first optical functionality sheet 12, a second optical functionality sheet 18, and a liquid crystal display panel 21. In the first optical functionality sheet 12, first microlenses 2 are formed on one surface of a first transparent member 1a, and a reflective member 6 is formed on the other surface, in areas other than the vicinity of the central axes of the first microlenses 2.

In the second optical functionality sheet 18, second microlenses 2 are formed on one surface of a second transparent member 1b, and a light-blocking member 7 is formed on the other surface, in areas other than the vicinity of the central axes of the second microlenses 2.

The first microlenses 2 and second microlenses 2 face the respective surfaces of the liquid crystal display panel 21, and the reflective member 7 is located so as to face the light emitting side of the backlight unit 4.

Light emitted from the backlight unit 4 is converted to collimated light by the first optical functionality sheet 12, and passes through the liquid crystal display panel 21, becoming image light 19.

This image light 19 strikes the second optical functionality sheet 18, is converged by the second microlenses 2, and then becomes diffused light and forms divergent image light 20.

In this way, it is possible to display light from the backlight unit 4 as image light that has a prescribed angle of visibility, at high brightness, and with a high contrast ratio.

It is also possible, as necessary, to place a film 30 (such as DBEF manufactured by 3M Corporation, or PCF manufactured by Nitto Denko Corporation) that has a selective-polarization reflection function, for example, between the first optical functionality sheet 12 and the liquid crystal display panel 21, as shown in FIG. 11, to further improve the brightness.

The microlenses 2 formed on the first and second optical functionality sheets 12 and 18 shown this embodiment should preferably be smaller than the pixels 22 of the liquid crystal display panel 21 (common pixel dimensions are about 90×270 μm).

Also, the optical functionality sheets illustrated in FIG. 11 both have microlenses 2 and a reflective film 6 or light-blocking film 7 as component elements, but one or the other can also be created by a method other than that in this embodiment, as necessary. Also, even if the first and second microlenses 2 are given the same shape, their functions do not change, and this makes it possible to use a common die or stamper for microlens forming.

Another embodiment in which the above described optical functionality sheet is applied to a liquid crystal display apparatus will now be described, using FIGS. 12A and 12B.

Figure 12A:
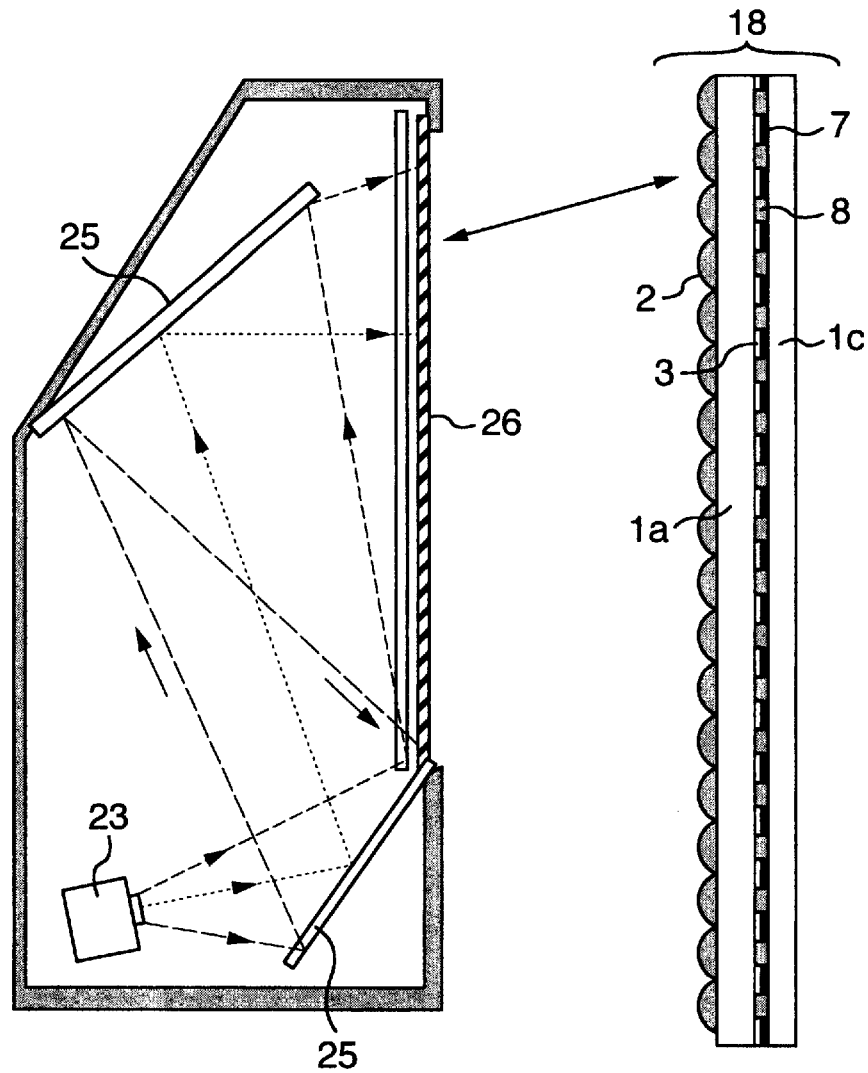
FIGS. 12A and 12B are explanatory drawings showing another embodiment of a liquid crystal display apparatus.
Figure 12B:
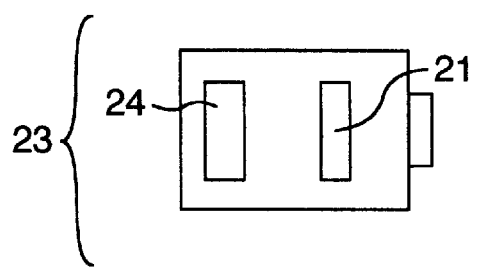

The liquid crystal display apparatus shown in FIG. 12A comprises a light source 24, a liquid crystal display panel 21, mirrors 25, a screen 26, and an optical functionality sheet 18. In the optical functionality sheet 18, microlenses 2 are formed on one surface of a transparent member, and a light-blocking member 7 is formed on the other surface, in areas other than the vicinity of the central axes of the microlenses 2, and the microlenses 2 of this optical functionality sheet 18 face the light emitting surface of the screen 26.

Light emitted from the light source 24 passes through the liquid crystal display panel 21 and is projected onto the screen 26 via the mirrors 25. Light projected onto the screen 26 is emitted externally via the microlenses 2, light-blocking film 7, and light-diffusing layer 8 of the optical functionality sheet 18.

By means of separately provided driving means (not shown), the light source 24, liquid crystal display panel 21, etc., are controlled, image information displayed on the liquid crystal display panel 21 is reflected using the mirrors 25, and that image information is projected in enlarged form on the screen 26.

By using a rear-projection type image display apparatus with the above described configuration, it is possible to obtain an image with better angle of visibility characteristics and contrast characteristics than when an optical functionality sheet 18 is not mounted on the screen 26.

By forming microlenses and a reflective film or light-blocking film, respectively, on the two sides of a transparent sheet, as described above, it is possible to realize with high precision an optical functionality sheet with excellent directivity with respect to incident light, and excellent angle of visibility characteristics.

Moreover, by using the above described optical functionality sheet, it is possible to realize a planar light source with excellent directivity, and also an image display apparatus with excellent display quality that has characteristics of a wide angle of visibility and high contrast.

While we have shown and described several embodiments in accordance with our invention, it should be understood that disclosed embodiments are susceptible of changes and modifications without departing from the scope of the invention. Therefore, we do not intend to be bound be the details shown and described herein but intend to cover all such changes and modifications as fall within the ambit of the appended claims.

What is claimed is:

1. An optical functionality sheet, comprising:
   a transparent member that has microlenses on one surface;
   a transparent conductive film; and
   a white diffuse reflection film formed on said transparent conductive film;
   wherein said transparent conductive film is provided on a surface of said transparent member having no microlenses, and at least one of said transparent conductive film and said white diffuse reflection film is provided in areas other than the vicinity of the central axes corresponding to an optical axis of said microlenses; and
   light emitted via said microlenses in the light entering from a side of said white diffuse reflection film of said reflective member is converted to nearly parallel light.

2. The optical functionality sheet according to claim 1, wherein both of said transparent conductive film and said white diffuse reflection film are provided in areas other than the vicinity of the central axes of said microlenses.

3. The optical functionality sheet according to claim 2, wherein said white diffuse reflection film is configured by at least one reflective film containing a metal.

4. An optical functionality sheet according to claim 2, wherein said reflective member comprises apertures in areas in the vicinity of the central axes of said microlenses, and said apertures are arranged so as to become narrower in the direction from the surface of said reflective member toward said microlenses.

5. The optical functionality sheet according to claim 1, wherein said white diffuse reflection film is configured by at least one reflective film containing a metal.

6. The optical functionality sheet according to claim 5, wherein said at least one reflective film containing a metal is a titanium oxide film.

7. The optical functionality sheet according to claim 5, wherein said white diffused reflection film is configured by said at least said one reflective film containing a metal and a second metal reflective film.

8. The optical functionality sheet according to claim 7, wherein said second metal reflective film is an aluminum film.

9. The optical functionality sheet according to claim 1, wherein said reflective member comprises apertures in areas in the vicinity of the central axes of said microlenses, and said apertures are arranged so as to become narrower in the direction from the surface of said reflective member toward said microlenses.

10. The optical functionality sheet according to claim 1, wherein at least said transparent conductive film is provided in areas other than the vicinity of the central axes corresponding to an optical axis of said microlenses.

11. The optical functionality sheet according to claim 1, wherein at least said white diffused reflection film is provided in areas other than the vicinity of the central axes corresponding to an optical axis of said microlenses.

* * * * *